US 8,504,736 B2

(12) United States Patent
Thaler et al.

(10) Patent No.: US 8,504,736 B2
(45) Date of Patent: Aug. 6, 2013

(54) FILE INPUT/OUTPUT SCHEDULER

(75) Inventors: Andrew R. Thaler, Brecksville, OH (US); Edward Adam Lerner, San Francisco, CA (US); Robert J. Mical, Redwood City, CA (US)

(73) Assignee: Sony Computer Entertainment America Inc., Foster City, CA (US)

(*) Notice: Subject to any disclaimer, the term of this patent is extended or adjusted under 35 U.S.C. 154(b) by 633 days.

(21) Appl. No.: 12/130,892

(22) Filed: May 30, 2008

(65) Prior Publication Data
US 2009/0300642 A1 Dec. 3, 2009

(51) Int. Cl.
*G06F 3/00* (2006.01)

(52) U.S. Cl.
USPC .................................. 710/5; 710/6

(58) Field of Classification Search
USPC .......................................... 710/5, 6
See application file for complete search history.

(56) References Cited

U.S. PATENT DOCUMENTS

| | | | |
|---|---|---|---|
| 6,434,569 B1* | 8/2002 | Toshimitsu et al. | 1/1 |
| 6,636,907 B1* | 10/2003 | Gaillard et al. | 710/25 |
| 6,671,772 B1* | 12/2003 | Cousins | 711/112 |
| 7,260,703 B1 | 8/2007 | Moore et al. | |
| 7,590,522 B2* | 9/2009 | Hansen et al. | 703/24 |
| 7,913,059 B2 | 3/2011 | Kawamura et al. | |
| 2003/0093640 A1* | 5/2003 | Mowery et al. | 711/167 |
| 2003/0188092 A1* | 10/2003 | Heath et al. | 711/111 |
| 2003/0229755 A1* | 12/2003 | Espeseth et al. | 711/112 |
| 2006/0161694 A1 | 7/2006 | Tomozaki et al. | |
| 2009/0193188 A1* | 7/2009 | Levine | 711/112 |

FOREIGN PATENT DOCUMENTS

| | | |
|---|---|---|
| JP | 2001-344073 | 12/2001 |
| JP | 2008-065478 | 3/2008 |

OTHER PUBLICATIONS

Cell Broadband Engine Architecture, copyright International Business Machines Corporation, Sony Computer Entertainment Incorporated, Toshiba Corporation Aug. 8, 2005 which may be downloaded at http://cell.scei.co.jp/.
PCT International Search Report dated Sep. 3, 2009 for international application No. PCT/US2009/043387.
Gwosdek, "Realtime Optical Flow Algorithms on the Cell Processor", Department of Computer Science, Saarland University, Apr. 14, 2008, entire document.
U.S. Appl. No. 12/902,768, filed Oct. 12, 2010.

(Continued)

*Primary Examiner* — Idriss N Alrobaye
*Assistant Examiner* — Zachary K Huson
(74) *Attorney, Agent, or Firm* — Joshua D. Isenberg; JDI Patent

(57) ABSTRACT

Handling of input or output (I/O) to or from a media device may be implemented in a system having a memory, a processor unit with a main processor and an auxiliary processor having an associated local memory, and the media device. An incoming I/O request received from an application running on the processor unit may be serviced according to the schedule. A set of processor executable instructions configured to implement I/O handling may include media filter layers. I/O handling may alternatively comprise: receiving an incoming I/O request from an application running on a main processor; inserting the request into a schedule embodied in the main memory; and implementing the request according to the schedule and one or more filters, at least one of which is implemented by an auxiliary processor.

36 Claims, 5 Drawing Sheets

OTHER PUBLICATIONS

Korean Notice of Preliminary Rejection (NPR) from the Korean Intellectual Property Office (KIPO) issued on Jun. 26, 2012.
Chinese First Office Action issued date on Feb. 1, 2012 for Chinese Patent Application No. 200980119736.8.
Japanese Notification of Reason(s) for Refusal issued date on Oct. 2, 2012 for Japanese Patent Application No. 2011-511688.
Japanese Notification of Reason(s) for Refusal issued dated on Oct. 2, 2012, for Japanese Patent Application No. 2011-511688.

* cited by examiner

FILE INPUT/OUTPUT SCHEDULER

FIELD OF THE INVENTION

Embodiments of this invention are related to computer gaming and related applications and more specifically to file input/output (I/O) management in computer gaming and related applications.

BACKGROUND OF THE INVENTION

Many software applications, such as video games, include a file input output (I/O) scheduler to make media access within an application more efficient and reliable. A file I/O scheduler ("FIOS") is a middleware layer for accessing files with several parts including a scheduler and optional I/O filter layers. The scheduler is typically designed to optimally sort I/O requests so that they complete in the shortest possible time subject to arbitrary deadline and priority constraints. The filter layers may provide additional services such as decompression or caching.

Many different game components require I/O access to files in storage media. Audio components load audio files; game-play engines load level definitions; graphics components load texture maps and models; movie components load audio-video files; and subsystems load large WAD files. The media may be game-delivery media such as optical discs (Universal Media Disc (UMD), compact disc (CD), digital video disc (DVD), Blu-Ray disc (BD), etc), intermediate storage media such as hard disks, or other media types as platforms evolve.

A single application, such as a video game, typically has multiple components, each component having its own I/O requirements. Some require streaming access to media, where the I/O system streams data in the file to the component so the component can present the streamed data in succession to the game player. For example, an audio component typically streams an audio file for soundtrack playback; a movie component streams audio-video content to play back a movie for the player. Other components need only non-streaming access where they retrieve data from the file in chunks for the component to process. These components don't need steady data flow, but chunk delivery timing is often crucial: if an application doesn't receive data when it is needed, performance may suffer.

Video games must often perform a considerable amount of I/O. Game events are often time driven with deadlines that must be met. For example, if a player is traveling from point A to Point B the game needs to have the files for data associated with point B loaded before the player gets there. Game components can use low-level I/O primitives to retrieve data from media, but these primitives don't handle device contention when multiple components require data from the same device at the same time. Jammed-up I/O requests can interrupt streaming data flow or prohibit critical data chunks from getting to a component when needed. Higher-level systems such as 989Sound's Streamsafe at least provide reliable stream access to files so that streamed data is not interrupted. Unfortunately, such systems allocate only a single data stream and don't handle contention for non-stream data very well. Conventional systems provide no standard layer that resolves contention for normal data access.

Because an application's components typically are not aware of each other's I/O activities, their I/O requests often result in highly inefficient I/O patterns with a substantial amount of overseeking (back-and-forth searches for data). As games grow larger, overseeking and inefficient data retrieval increase. Disk mastering for distribution media such as a CD can help avoid some of this inefficiency through techniques such as duplicating frequently accessed data blocks and distributing them across the disk so a copy will always be nearby no matter where the read head of the storage device is. File systems do not always reveal where data is physically located on a disc, though, so I/O systems cannot always make best use of the data.

It is within this context that embodiments of the present invention arise.

SUMMARY OF THE INVENTION

According to an embodiment of the present invention a method for handling input or output (I/O) to or from a media device may be implemented in a system having a processor unit, a memory, and the media device. An incoming I/O request to transfer data to or from the media device may be received from an application running on the processor. A predicted time $T_p$ to complete the incoming I/O request may be computed. The incoming I/O request may be inserted into a schedule embodied in the memory. The position of the incoming I/O request within the schedule may depend at least partly on the predicted time $T_p$. The incoming I/O request may be serviced according to the schedule.

In some embodiments, a set of processor executable instructions may be embodied in the memory. The instructions may be configured, when executed, to implement the above method. The set of processor executable instructions may include one or more media filter layers. The media filter layers may include a de-archiver layer, a RAM cache layer, a scheduler cache (e.g., a hard disk drive (HDD) cache) layer, an overlay layer, a catalog cache layer, a data transform layer, or a simulated data layer.

In some embodiments, the predicted time $T_p$ may be calculated according to a performance characteristic equation (PCE) involving one or more parameters of the media device and one or more coefficients determined from the incoming I/O request. By way of example, and without loss of generality, the parameters may include a request overhead x, a head movement rate y and a throughput z. In such an example, the coefficients may include an overhead coefficient A, a head travel distance B and an amount of data to transfer C. The performance characteristic equation may be of the form $T_p = Ax + By + Cz$.

In some embodiments, the PCE coefficients for an I/O request may be determined based on the I/O request and an initial media state, which may contain one or more pieces of information about a state of the device which affects performance. By way of example, and without loss of generality, the one or more pieces of information may include a ready state of the device, and the last logical block address (LBA) accessed. In some embodiments, the calculation of the PCE coefficients from an I/O request and initial media state may return an updated media state, which can be used as the initial media state for another PCE computation.

In some embodiments, the PCE coefficients may be combined with values for the unknowns in the PCE to compute a predicted time Tp for any given I/O request. The total time T for an ordered list of I/O requests may subsequently be calculated by iterating the PCE and media state for each I/O request in the list, and summing the resulting times Tp. This process may be repeated for some or all permutations of the ordered list of I/O requests. A preferred ordering of the list may be selected from among the plurality of permutations based on the time T computed for each ordering, and possibly other criteria. In some embodiments, the preferred ordering may be the permutation which results in the minimum time T. Additional criteria which may affect the ordering may include (but are not limited to) I/O request priorities, stream buffer states, and latency requirements.

In some embodiments, an actual time taken $T_a$ for any I/O request may be measured and used in conjunction with the PCE coefficients to iteratively solve the PCE for the unknowns. This may allow the model to be constantly updated with the actual drive performance.

In some embodiments, implementing the I/O request may further comprise extracting specific data from a compressed nested archive.

In some embodiments, the processing unit may include a main processor and an auxiliary processor having an associated local memory. In such embodiments, implementing the I/O request may include transferring data from the media device to the local memory and transforming the data in the local memory using the auxiliary processor.

In some embodiments, the system may further comprise a graphics processor and an associated graphics memory. In such embodiments, implementing the I/O request may include transferring data from the media device into the graphics memory, transferring the data from the graphics memory to the local memory, performing a data transform on the data using the auxiliary processor to produce transformed data and transferring the transformed data back to the graphics memory.

In some embodiments, implementing the I/O request may include implementing a data overlay, wherein one or more primary data units transferred between the media device and the memory are replaced with one or more secondary data units from a secondary data source. A source of the primary data units and the secondary data source may be located on the same media or on different media. The secondary data source may be a virtual data source. The secondary data units may be specified by a callback.

In some embodiments, the system may further include a fast storage device. In such a case, implementing the I/O request may include pre-fetching one or more data units from the media device to the fast storage device and, subsequently transferring the data units from the fast storage device. By way of example, the fast storage device may be a hard disk drive and media device may be a high-capacity optical disc drive such as a Blu-Ray disc drive. The data units may be pre-fetched during a period of time when I/O is otherwise idle. In some embodiments, the pre-fetching may include pre-fetching a first group of one or more data units from the media device, checking for idleness of the slow media device, and pre-fetching a second group of one or more data units from the slow media device if I/O is idle, or delaying a pre-fetch of the second group if I/O is not idle.

In some embodiments, computing the predicted time $T_p$ may include adjusting the parameters to emulate operation of a slower media device than the actual media device associated with the system.

According to an embodiment of the present invention a method for handling input or output (I/O) to or from a media device may be implemented in a system having a main processor, an auxiliary processor having an associated local memory, a main memory, and a media device, a method. The method may comprise: a) receiving an incoming I/O request from an application running on the processor to transfer data to or from the media device; b) inserting the incoming I/O request into a schedule embodied in the main memory; and c) implementing the incoming I/O request according to the schedule and one or more filters, wherein at least one of the filters is implemented by the auxiliary processor.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

Embodiments of the present invention may be implemented around a file I/O Scheduler (FIOS) that provides a centralized layer that all I/O for a system passes through. The FIOS may include a scheduler that sorts I/O requests and determines an order in which to service the I/O requests most efficiently.

Figure 1:
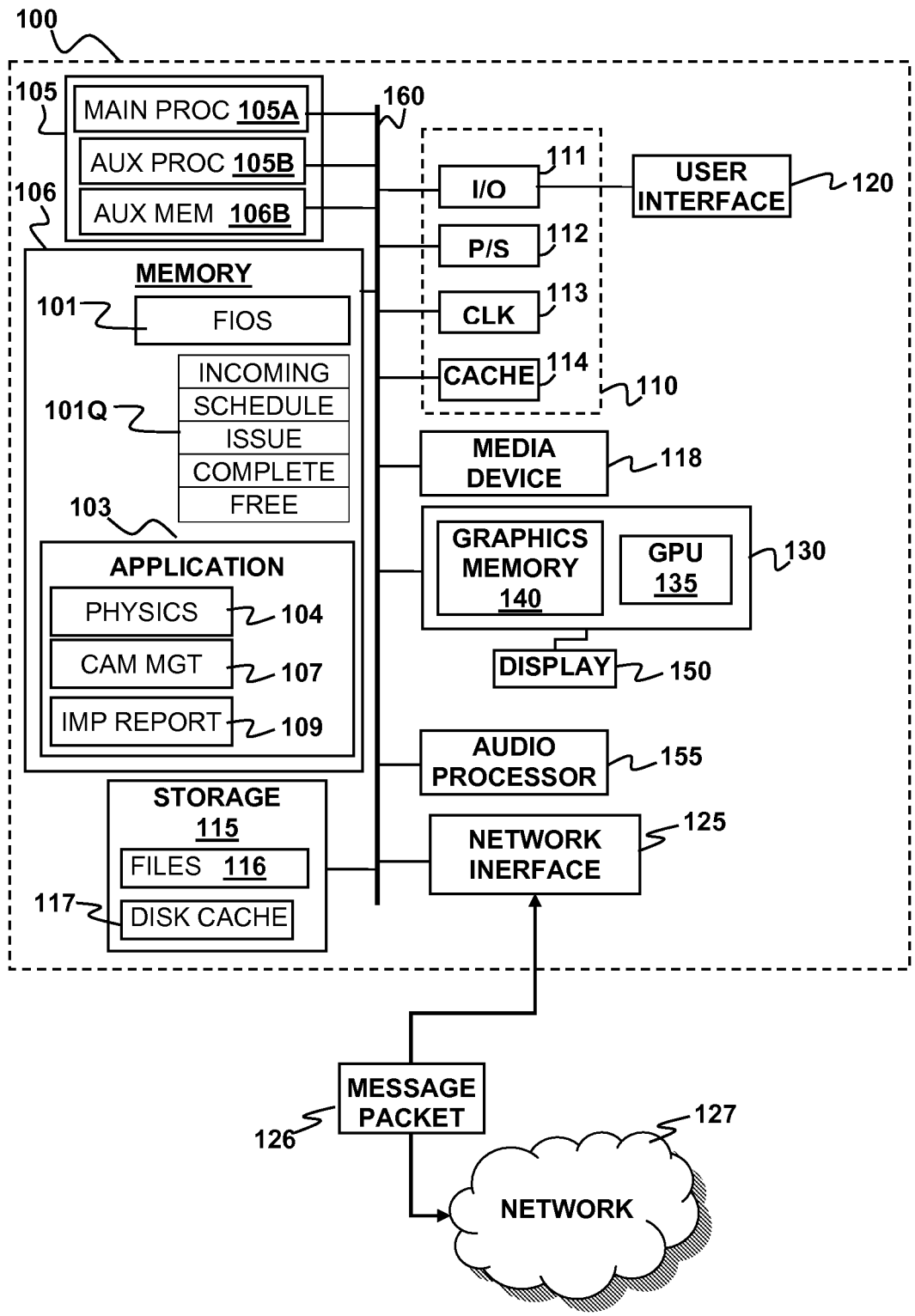
FIG. 1 is a block diagram of a system that implements a file I/O system (FIOS) according to an embodiment of the present invention.

By way of example, a computer implemented system 100 may be configured to implement a file I/O scheduler (FIOS) according to an embodiment of the present invention as shown in FIG. 1. By way of example, and without loss of generality, the system 100 may be implemented as a personal computer, video game console, personal digital assistant, or other digital device, suitable for practicing embodiments of the invention. The system 100 may include a processing unit 105 and a main memory 106 coupled to the processing 105. The CPU 105 configured to run software applications and, optionally, an operating system. Some embodiments of the present invention may take advantage of certain types of processor architecture in which the CPU 105 includes a main processor 105A and an auxiliary processor 105B having its own associated local memory 106B. One example, among others of such a processor architecture is a Cell Processor. An example of a Cell Processor architecture is described in detail, e.g., in Cell Broadband Engine Architecture, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

The main memory 106 may store applications and data for use by the CPU 105. The memory 106 may be in the form of an integrated circuit, e.g., RAM, DRAM, ROM, and the like). A computer program 101 may be stored in the memory 106 in the form of instructions that can be executed on the processor 105. The instructions of the program 101 may be configured to implement, amongst other things, a file input/output system (FIOS) having certain features described below. The memory 106 may contain I/O queues 101Q, e.g., in the form of stacks or queues for incoming, scheduled, issued, completed and free I/O requests that are used by the FIOS program 101. Examples of such queues are also described below.

By way of example, the FIOS program 101 may include instructions to a) receive an incoming I/O request involving the media device 118 from the application 103, b) compute a predicted time $T_p$ to complete the I/O request, c) insert the incoming I/O request into a position in a schedule in the memory 106 based at least partly on the predicted time $T_p$, and d) implement the I/O request according to the schedule.

The FIOS program 101 may operate in conjunction with one or more instructions configured to implement an interactive environment. By way of example, such instructions may be a subroutine or callable function of a main program 103, such as a video game program. Alternatively, the main program 103 may be a program for interfacing with a virtual world. The main program 103 may be configured to display a scene of a portion of the simulated environment from the camera POV on a video display and change the scene as the camera POV changes in response to movement of the camera POV along a camera path during the user's interaction with the simulated environment. The main program may include instructions for physics simulation 104, and camera management 107. The main program 103 may call the FIOS program 101, physics simulation instructions 104, camera management instructions 107 and advertising impression reporting instructions 109, e.g., as a functions or subroutines.

The client system 100 may also include well-known support functions 110, such as input/output (I/O) elements 111, power supplies (P/S) 112, a clock (CLK) 113 and cache 114. The client device 100 may further include a fast storage device 115 such as a hard disk drive that provides non-volatile storage for applications and data. The fast storage device 115 may be used, among other things, for temporary or long-term storage of files 116 retrieved from a slower media device 118. Files 116 on the fast storage device 115 may additionally come from sources other than the slower media device 118. For example, the files 116 may include, but are not limited to, operating system files, temporary files created by an application, user data such as photos/audio/video, downloaded content, and more. By way of example, the storage device 115 may be a fixed disk drive, removable disk drive, flash memory device, tape drive. The slower media device 118 may be a high-capacity optical disc drive, e.g., a CD-ROM drive, DVD-ROM drive, high-definition digital versatile disc (HD-DVD) drive, a Blu-ray disc drive, a UMD drive, or other optical storage devices. Pre-fetched files 116 from the media device 118 may be temporarily stored in the storage device 115 in a hardware cache for quick loading into the memory 106.

One or more user input devices 120 may be used to communicate user inputs from one or more users to the system 100. By way of example, one or more of the user input devices 120 may be coupled to the client device 100 via the I/O elements 111. Examples of suitable input device 120 include keyboards, mice, joysticks, touch pads, touch screens, light pens, still or video cameras, and/or microphones. The client device 100 may include a network interface 125 to facilitate communication via an electronic communications network 127. The network interface 125 may be configured to implement wired or wireless communication over local area networks and wide area networks such as the Internet. The system 100 may send and receive data and/or requests for files via one or more message packets 126 over the network 127.

The system 100 may further comprise a graphics subsystem 130, which may include a graphics processing unit (GPU) 135 and graphics memory 140. The graphics memory 140 may include a display memory (e.g., a frame buffer) used for storing pixel data for each pixel of an output image. The graphics memory 140 may be integrated in the same device as the GPU 135, connected as a separate device with GPU 135, and/or implemented within the memory 106. Pixel data may be provided to the graphics memory 140 directly from the CPU 105. Alternatively, the CPU 105 may provide the GPU 135 with data and/or instructions defining the desired output images, from which the GPU 135 may generate the pixel data of one or more output images. The data and/or instructions defining the desired output images may be stored in memory 106 and/or graphics memory 140. In an embodiment, the GPU 135 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 135 may further include one or more programmable execution units capable of executing shader programs.

The graphics subsystem 130 may periodically output pixel data for an image from the graphics memory 140 to be displayed on a video display device 150. The video display device 150 may be any device capable of displaying visual information in response to a signal from the system 100, including CRT, LCD, plasma, and OLED displays. The computer system 100 may provide the display device 150 with an analog or digital signal.

By way of example, the display 150 may include a cathode ray tube (CRT) or flat panel screen that displays text, numerals, graphical symbols or images. In addition, the display 150 may include one or more audio speakers that produce audible or otherwise detectable sounds. To facilitate generation of such sounds, the client device 100 may further include an audio processor 155 adapted to generate analog or digital audio output from instructions and/or data provided by the CPU 105, memory 106, and/or storage 115.

The components of the system 100, including the CPU 105, memory 106, support functions 110, data storage device 115, media device 118, user input devices 120, network interface 125, and audio processor 155 may be operably connected to each other via one or more data buses 160. These components may be implemented in hardware, software or firmware or some combination of two or more of these.

Figure 2:
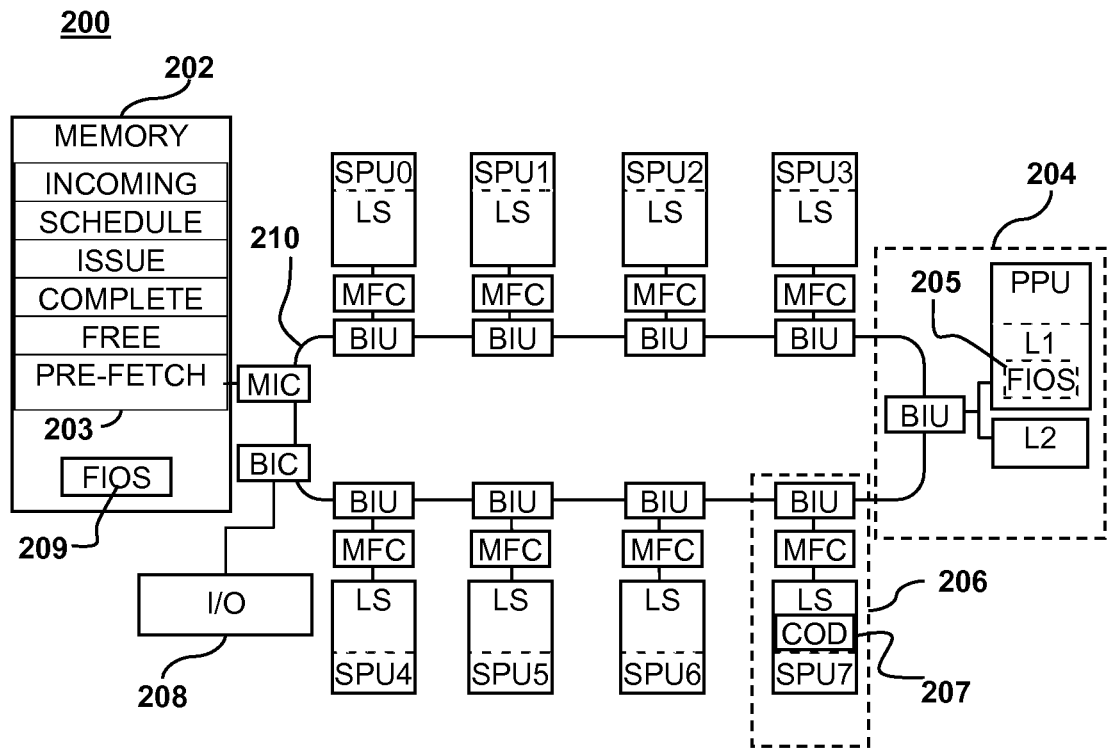
FIG. 2 is a block diagram of an alternative system a system that implements a FIOS according to an alternative embodiment of the present invention.

Some embodiments of the present invention may take advantage of a Cell processor architecture or similar processor architecture. FIG. 2 illustrates an example of cell processor 200 configured to implement a FIOS according to an embodiment of the present invention. The cell processor 200 includes a main memory 202, a single power processor element (PPE) 204 and eight synergistic processor elements (SPE) 206. By way of example, the PPE 204 may include 64-bit PowerPC Processor Unit (PPU) with associated caches. Some implementations, e.g., CBEA-compliant systems may include a vector multimedia extension unit in the PPE 204. The PPE 204 may be a general-purpose processing unit that can access system management resources (such as memory-protection tables). Hardware resources may be mapped explicitly to a real address space as seen by the PPE 204. Therefore, the PPE 204 may address any of these resources directly by using an appropriate effective address value. A primary function of the PPE 204 is the management and allocation of tasks for the different SPE 206. The PPU may execute coded instructions of a FIOS program 205.

The SPE 206 are less complex computational units than PPE 204, in that they need not perform any system management functions. Each SPE 206 includes a processor unit, sometimes referred to as a synergistic processor unit (SPU) and an associated local store (LS). The SPE 206 may generally have a single instruction, multiple data (SIMD) capability and typically process data and initiate any required data transfers (subject to access properties set up by the PPE 204) in order to perform their allocated tasks. An SPE 206 may store in its local store instructions 207 that implement portions of FIOS program 205. The purpose of the SPE 206 is to enable applications that require a higher computational unit density and can effectively use the provided instruction set. Although eight SPE are shown in this example, the cell processor 200 may be configured with any number of SPE. With respect to FIG. 2, the memory 202, PPE 204, and SPE 206 can communicate with each other and with an I/O device 208 over a ring-type element interconnect bus 210. The memory 202 may be accessed by the PPE 204 and SPEs 206 via a memory interface controller MIC.

The memory 202 may contain I/O queues 203, e.g., incoming, schedule, issue, complete, free and pre-fetch queues, as described below. The memory 202 may also contain portions of a FIOS program 209 having features in common with the FIOS program 101 described herein. At least one of the SPE 206 may include in its local store code 207 configured to implement data decompression as discussed below. The PPE 204 may include an internal cache L1 and an external cache L2. The PPE 204 may store portions of the FIOS program 205 in its internal cache L1. The FIOS program 205 and the SPE implemented file transfer instructions 207, or portions thereof, may also be stored in memory 202 for access by the SPE 206 and PPE 204 when needed.

Figure 3:
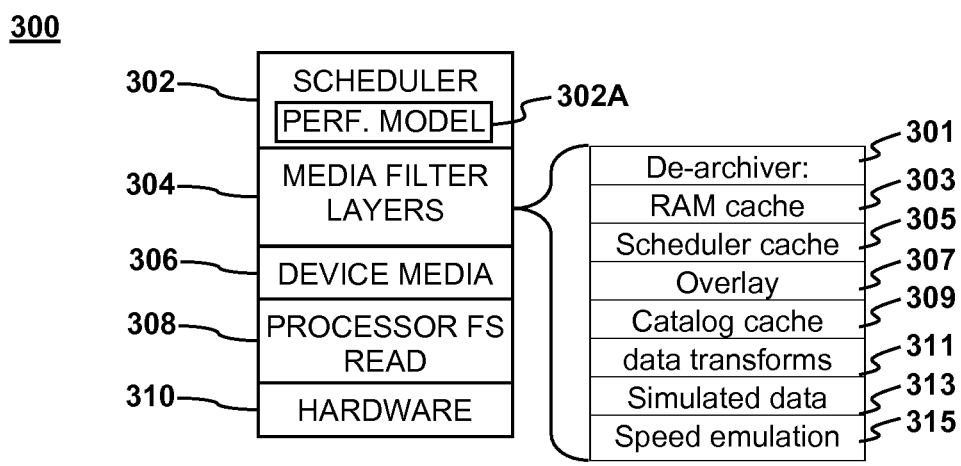
FIG. 3 is a block diagram of a file input/output system (FIOS) software according to an embodiment of the present invention.

By way of example, the FIOS program 101/205 may include a media stack to facilitate interfacing with hardware such as storage device 115. The media stack may be implemented as depicted in FIG. 3. Specifically, a media stack 300 may include a scheduler 302, one or more media filter layers 304, a device media layer 306, a processor file system (FS) read layer 308 and a hardware layer 310. The device media layer 306 (sometimes called the media access layer) may be configured to respond to media requests received from the media filter layers 304 above, retrieving the requested data, then sending its reply back up the stack.

The media filter layers 304 may include a de-archiver layer 301, a RAM cache layer 303, a scheduler cache layer 305, an overlay layer 307, a catalog cache layer 309, one or more data transform layers 311, and a simulated data layer 313, and a speed emulation layer 315.

The de-archiver 301 may be used to facilitate extraction of specific asset files from compressed archives. The RAM cache layer 303 may be used to implement caching of data, e.g., in the main memory 106, 202. The scheduler cache 305 may be a simple disc-to-disc cache for temporarily storing data from a slower source such as an optical disc. As used herein, the term "scheduler cache" refers to a temporary data storage in a storage medium that is faster to access than the media device 118. It is not necessary for all data in the scheduler cache 305 to be pre-fetched; some may be fetched on-demand and copied into the cache.

By way of example, and not by way of limitation, the scheduler cache layer 305 may utilize the fast storage medium 115 to provide such temporary storage. In the particular case where the fast storage medium is a hard disk drive (HDD), the scheduler cache 305 is sometimes referred to as an HDD cache.

The scheduler cache 305 may be kept as a single file or as multiple files. In addition, the contents of the scheduler cache 305 need not be whole files. A multiple-file cache may be partially flushed by deleting some of the individual files, to intelligently free up disk space when needed without sacrificing too much data. Single-file caches, by contrast, typically can only be truncated or entirely deleted. Single-file caches may provide higher performance than multi-file caches since a multi-file cache typically requires additional bookkeeping work (inside the host filesystem itself), which may require extra I/O.

The overlay layer 307 may be used to allow arbitrary overlaying of files and directories at the filesystem level as discussed below. The catalog cache layer 309 may be used to cache data that the O/S for the processor unit 105 or cell processor 200 may not properly cache (e.g., file existence, size, and location). The data transform layer 311 may implement data transforms such as encryption, decryption, compression or decompression on data that is read from or written to the media device 118. The simulated data layer 313 may be used, e.g., to generate zeros or random numbers for I/O requests that require such simulated data. The speed emulation layer 315 may be used, e.g., during software development to simulate different speeds of media devices, as discussed below.

Operation of the scheduler 302 may be understood with respect to FIG. 4, which is described below. From a client application's point of view, an I/O request 403 may be serviced in a relatively straightforward manner. For example, a thread 402 within an application 401, such as a video game may request I/O through the FIOS 101/205 by calling a function (e.g., readFile( )). The function may specify a priority for the FIOS request 403 and a deadline by which the request should be completed. The function may also provide a pointer to a buffer 405. Such an implementation may atomically allocate an I/O operation structure for the I/O request 403 and move the newly allocated operation to an incoming queue 404. By way of example, the incoming queue may be a first-in-first-out (FIFO) queue wherein the first I/O operation placed in the queue 404 is the first operation scheduled by the scheduler 302. Insertion of the request 403 into the incoming queue 404 may be implemented by an atomic operation to prevent threads from being blocked when requesting asynchronous I/O. In some embodiments, the incoming queue 404 may be in the form of an atomic stack, which may be filled by the auxiliary processor 105B with an atomic exchange.

By way of example, and not by way of limitation, if the I/O request 403 is a read operation, the client application 401 may supply a buffer to receive data retrieved from a media device. When the I/O request is completed, the client application may read the retrieved data from the buffer it supplied. When the client is finished with the operation structure, the client may de-allocate the operation structure so that its resources are available for future I/O use.

The I/O request 403 may activate the scheduler 302 if the scheduler isn't already activated, and may return a user-visible handle to the structure so the application 401 has access to the operation. The application 401 may then wait for the I/O request 403 to be completed. For example, the client application may poll periodically using an atomic method (e.g., isDone ( )). Alternatively, the client application may wait for a callback function that the scheduler 302 calls when the I/O request is completed.

After the I/O request has been inserted into the incoming queue 404, the FIOS program 101/205 may invoke the scheduler 302 to perform a schedule insertion 407. The sequence of operations implemented by the scheduler may be understood with reference to FIG. 5. The scheduler 302 may sleep (i.e., remain inactive) as indicated at 502 if there is no I/O to handle. When a new I/O operation enters the incoming queue, the scheduler awakes to handle it. Once the scheduler wakes up (or is already awake), it notices the new operation in the queue and moves the operation into an appropriate location in the scheduling queue 406.

To determine the queue position of the I/O request 403, the scheduler 302 may optionally determine a current state of the media device e.g., by querying the device media layer 306 or another layer in the FIOS stack 300 as indicated at 503. The state data may vary depending on the type of media device handled by the FIOS stack 300 and on the various layers present in the stack. Examples include the most-recently-accessed logical block address (LBA), the RAM cache's last-accessed path and offset, the current disc layer, the head position, streaming mode, and non-streaming mode.

According to embodiments of the present invention, the scheduler 302 may be based on media device performance model 302A. Unlike existing I/O schedulers, the drive model may take into account data regarding the performance of the media device 118 in determining an optimum scheduling of the request 403. Scheduling I/O requests using a drive model may be compared to the inverse of the mastering process in generating a CD. The performance model 302A may be configured to take into account such factors as overhead, disk move time, read time, and the like. The performance model 302A may model arbitrarily complex characteristics of the media device 118 such as throughput, laser wiggles, read head movements, layer changes, and request overhead. The performance model 302A may also take into account other parameters of the particular medium being read or written to by the media device 118 involved in the I/O request. For example, the performance model 302A may consider whether the device is reading from a single layer disk or a multiple layer disk, e.g., a dual layer disks, such as a Blu-Ray DMD.

The scheduler 302 may also optionally look at the new I/O operation's timing requirements, priority, and possible efficiencies, as indicated at 504. The scheduler may be configured to compute a predicted time $T_p$ to complete the incoming I/O request, as indicated at 506. According to a preferred embodiment, the scheduler 302 may determine the predicted time $T_p$ for executing the I/O request 403 according to a performance characteristic equation (PCE) having as variables parameters related to the media device 118 and coefficients related to the I/O request 403.

The PCE may have the general form:

$$T_p = Af_1(x) + Bf_2(y) + Cf_3(z) + Df_4(w) + Ef_5(v) + \ldots,$$

Where A, B, C, D and E are coefficients and x, y, z, w and v represent parameters related to the performance characteristics of the media device and $f_1(x)$, $f_2(y)$, $f_3(z)$, $f_4(w)$, $f_5(v)$ . . . are functions of x, y, z, w and v. By way of example, and not by way of limitation, the PCE may be a linear equation in the form of a sum of one or more terms, with each term being a coefficient (A,B,C, etc . . . ) multiplied by a variable representing a parameter value (x,y,z, etc . . . ). Such an equation may have the following form:

$$T_p = Ax + By + Cz + Dw + Ev + \ldots$$

The equation may have an arbitrary number of terms. The variables may correspond to any parameter of the media device that affects the time for performing the required task. Examples of such parameters include, but are not limited to overhead, seek time, and data transfer rate. In practice, the PCE may use many more than 3 terms , e.g., 10 or more terms. For example, a single read operation often requires 6 significant terms to describe it: 1. open-file, 2. overhead, 3. seek, 4. transfer, 5. decompression, 6. close-file. Other operations (open, close, unlink, read directory) typically require different sets of terms.

As an alternative to linear equation, the PCE may be expanded to a general polynomial equation: the sum of one or more terms, with each term being a coefficient (A) multiplied by a corresponding variable raised to some power. For example, the PCE may have the form:

$$T_p = Ax + By + Cz^2 + Dw^{10} + Ev^{-2} \ldots$$

As another alternative, the PCE may be expanded to any general equation which can be expressed as the sum of one or more terms, with each term being a coefficient (A) multiplied by an arbitrary function of a corresponding variable. For example, the PCE may have the form:

$$T_p = Ax + B \log y + Ce^z + D(w^2 + 2w + 1) + \ldots$$

As a simple example, a linear PCE may have the form $T_p = Ax + By + Cz$, where: x is a parameter related to an overhead for the request 403, y is a parameter related to head movement time per sector of movement, and z is a parameter related to a data throughput rate (e.g., a time to read or write a given amount of data). The value of the coefficients A, B and C may depend on the position of the request 403 in the schedule queue 404.

By way of example, the coefficients A, B, C may be determined from a state as well as from information in the request 403. By way of example, and without loss of generality, the one or more pieces of information may include the ready state of the device, and the last logical block address (LBA) accessed. The last logical block address may indicate the current position of the drive's read head, and thus allow computing of the seek distance (head travel distance).

In this example, the coefficient A is referred to herein as an overhead coefficient. This coefficient takes into account the fact that the overhead may partly depend on the nature of the I/O request 403 as well as the properties of the media device 118. The coefficient B may be related to an amount of head movement that a read head in the media device 118 must make in order to get to the location on the media where the data is to be read from. By way of example, the request 403 may call for the media device 118 to read 10 sectors starting from sector 1000). In such a case the data coefficient C may be the number of sectors to be read. The movement coefficient B may be determined from state information, which may be obtained from the device media layer 306. The state information may include an initial location of the read head at the start of the I/O request. For example if the read head is initially at sector 500, the movement coefficient B may be determined from the difference between the sector where the read is to start (sector 1000) and the current sector (sector 500), e.g., B=1000−500=500. The scheduler 302 may determine a final state after the I/O request 403 has been completed, e.g., if 10 sectors are read starting at 1000, the final state may indicate that the read head ends up at sector 1010.

The PCE may also take into account different possible scenarios for filling out an I/O request. For example, if the media device 118 uses a multiple layer medium the PCE may take into account the effect on the predicted time $T_p$ of switching from one layer to another then moving the read head.

In some embodiments, the actual time taken $T_a$ for any I/O request may be measured and used with the PCE coefficients to iteratively solve the PCE for values of unknown variables. This may allow the model to be constantly updated with the actual drive performance.

Once the predicted time $T_p$ is calculated, the scheduler 302 may determine the predicted times for other requests in the schedule queue 406 in a similar fashion. This process may be repeated iteratively with different queue orders until an actual time for the request 403 and a best schedule queue order is determined, as indicated at 507. Note that the initial state for the request 403 may be determined from the ending state for the previous request in the schedule order and the initial state for the next request in the schedule order may be determined from the final state of the request 403.

The scheduler 302 may walk through the requests in the scheduling queue, comparing the characteristics of the request 403 against those of other operations already in the queue. The scheduler 302 may try the request 403 at each possible location in the queue, looking for priority overrides, missed deadlines, and timing considerations. The scheduler 302 may determine a best possible new queue order by looking for an order in which no requested I/O operation misses its deadline. If one or more operations must miss their deadlines, the scheduler may determine the queue order using different criteria. Additional criteria which may affect the ordering of the requests in the schedule queue 406 may include (but are not limited to) I/O request priorities, stream buffer states, and latency requirements. In some embodiments, the PCE coefficients for one $T_p$ computation may be used to return an updated media state, which can be used as the initial media state for another PCE computation.

According to one example, the scheduler 302 may check different insertion permutations, e.g., insert operation 4 in an existing schedule containing operations 1, 2, 3. Each permutation may produce a different total time T. Possible permutations and times include:

$$4, 1, 2, 3 \rightarrow T_1$$
$$1, 4, 2, 3 \rightarrow T_2$$
$$1, 2, 4, 3 \rightarrow T_3$$
$$1, 2, 3, 4 \rightarrow T_4$$

The scheduler 302 may determine which permutation produces the minimum predicted total time T and use this permutation as the preferred one.

In addition, the scheduler 302 may check for predicted missed deadlines, e.g., by adding up the times for each scheduled item and see if this results in any scheduled item missing its deadline. This may involve determining a completion time for each scheduled operation and comparing the completion time against a deadline for that operation. If any deadlines would be missed, the operation may be rescheduled to an earlier place in the queue.

In some embodiments, priorities may be used, e.g., if deadlines can't all be resolved. For example, if some deadlines will inevitably be missed, the best queue order may be one in which the lowest-possible-priority operations miss their deadlines. If there are multiple possible queue orders which fit the previous consideration, then the queue order that has the lowest number of equal-priority deadline-missing operations may be the best order. If there are multiple possible queue orders in which all the previously described considerations are equal, then the queue order with the lowest total estimated time to execute the whole queue may be the best order. In some cases, a low priority operation may be scheduled before a high priority operation so long as the high priority operation can meet its deadline.

If there are multiple possible queue orders in which all the previously described considerations are equal, then the order where the newest operation in the schedule queue 406 goes to the end of the queue may be the best order. If the scheduler 302 has to estimate a total queue execution time to insert the new operation in the queue, it may consider a number of different factors. For example, the scheduler may consider a current state of the device driver that the scheduler 302 retrieved just before the queue order evaluation. In addition, the scheduler 302 may consider performance coefficients reported by the media filter layers and other layers in the FIOS stack 300. These values may include, e.g., head movement, head alignment, DMA setup, data transfer rate, layer change for storage layers, and so on. These values may be fed by runtime measures of I/O performance so that the estimates can be as true as possible.

Figure 4:
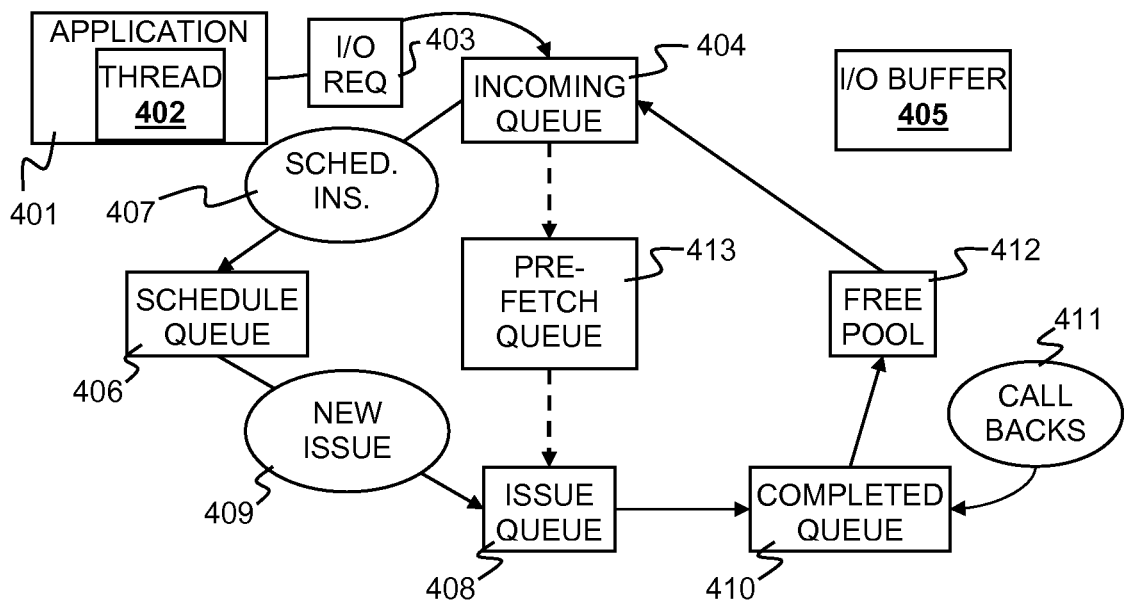
FIG. 4 is a data flow diagram illustrating a flow of operations in a FIOS according to an embodiment of the present invention.
Figure 5:
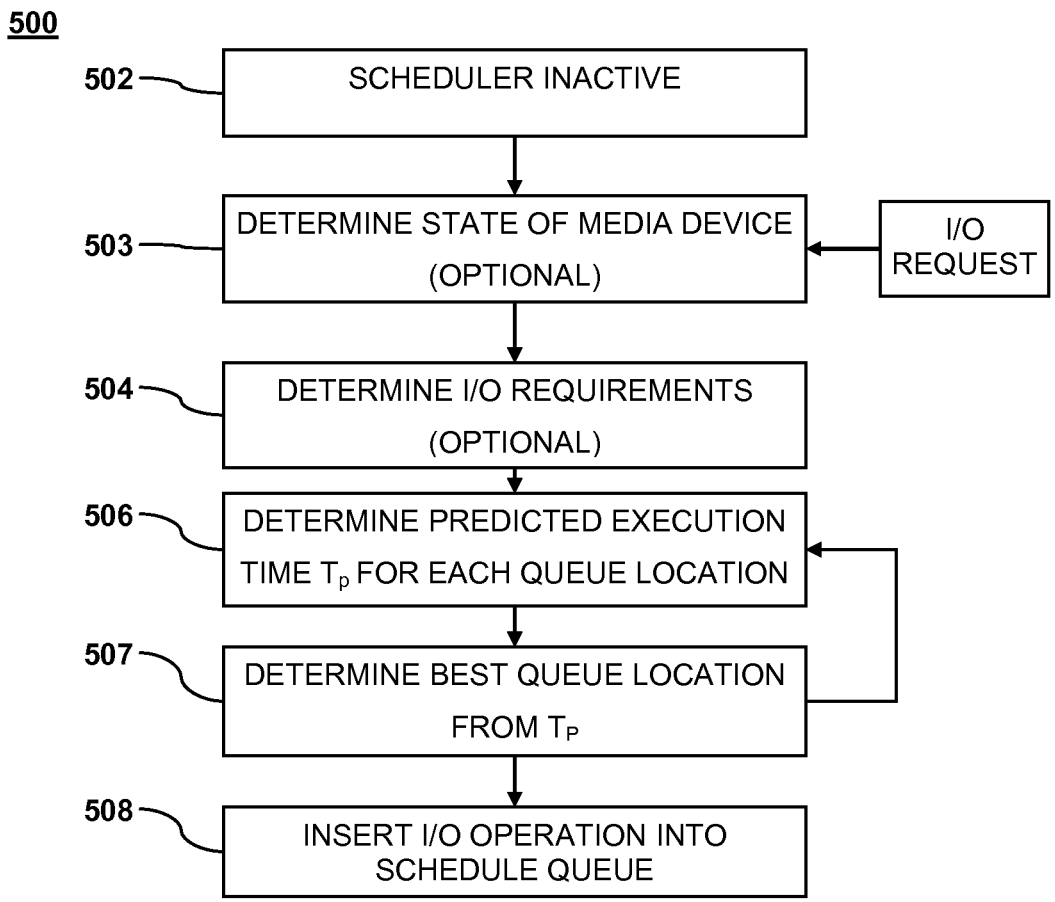
FIG. 5 is a flow diagram illustrating an example of a software scheduler used in a FIOS according to an embodiment of the present invention.

Once the scheduler 302 has determined the best position in the queue 406 for the operation in the request 403, the operation may be inserted there, as indicated at 407 in FIG. 4 and at 508 in FIG. 5. Referring again to FIG. 4, if there are resources available to execute I/O requests, the scheduler 302 may move the first operation in the schedule queue 406 to an issue queue 408 as indicated at 409. The operation's associated media request may be executed from the issue queue 408. To execute a media request, the scheduler 302 may pass the request down to the first of the layers in the FIOS stack 300.

Each layer below the scheduler 302 may see the media request 403 passed to it by the layer above. If appropriate, a layer may process the data. For example, if the request is a read operation, the de-archiver layer 301 may check the supplied pathname against the contents of open archives, and, if it finds the file, may remap the request into a read of the compressed data. Each layer in the FIOS stack 300 passes the processed or unprocessed media request to the next lower layer until the request finally reaches the hardware layer 310. When the hardware layer 310 responds to the request, the response goes through each layer in the stack 300 from bottom to top, and each layer may process the retrieved data if appropriate. For example, the de-archiver layer 301 may know that the returned data must be decompressed, so it decompresses it before passing the response back up the stack. The response finally goes back to the scheduler 302 for completion.

When retrieved data comes back up the stack, the scheduler 302 may receive it and then move the I/O operation to a completed queue, which may trigger a callback function 411 to the application 401 (if the callback was set up by the application.) Alternatively, the application 401 may poll the FIOS stack 300 to determine if a requested I/O operation has been completed. Once an I/O operation has been completed, it may be moved to a free operation pool 412. The free operation pool 412 may contain a set of I/O operation structures that are not in use. Such operations may include those that have never been allocated to a client application or those that have been used by a client application and then freed for use again. When a client application makes an I/O request, the scheduler 302 may allocate an I/O operation to the client from this pool. The free I/O pool 412 may be implemented as a stack. Free I/O requests may be popped from the free operation pool 412 and pushed onto the incoming queue 404. In this manner, free I/O requests may be re-used.

According to embodiments of the invention, the scheduler 302 may operate in a schedule loop, as follows:

1. Check for I/O completion
2. Issue new I/O requests
3. Issue I/O call backs (if any)
4. Insertion to schedule (scheduling insertion from incoming)
5. New issues again.
6. Check for predicted missed deadlines.
7. Return to 1.

The number of schedule insertions for each iteration of the loop may be limited to some maximum number, e.g., sixteen insertions.

In some embodiments of the invention, an auxiliary processor unit 105B (e.g., SPE 206) could request I/O on its own by adding a request for I/O to the incoming queue 404 through an exchange that is atomic with respect to the main processor 105A or PPE 204. For example, in a conventional Cell processor implementation, an SPE 206 might not have any I/O facilities. However, if the incoming queue 404 is a common data element, an auxiliary processor could add an I/O request to the queue through a standard atomic exchange with the main processor 105A and signal the main processor 105A.

In many prior art implementations, if an auxiliary processor needs data for immediate processing, that data has to be in main memory. With embodiments of the present invention, by contrast, the auxiliary processor 105B may trigger the FIOS stack 300 to go get needed data from the hard media device 118 or even over the network 127.

By way of example, and not by way of limitation, the incoming queue 404, completed queue 410 and free pool 412 may be atomic stacks. The auxiliary processor 105B may pop an operation from the free pool 412, fill out a path and offset for the operation, push the operation back onto the incoming queue 406 and then perform synchronization and wake up the scheduler 302. The auxiliary processor may do other work while intermittently polling for completion of the I/O operation.

By way of example, in the cell processor system 200, an I/O request may be serviced by an SPE 206 using a sequence of instructions of the following type:

Op=pop(FREE)
Op path= . . .
Offset= . . .
Push (op, incoming).

The data requested by the SPE 206 may be sent to anyplace addressable by PPE 204. If the SPE 206 were locked, the FIOS 300 could write the data directly to the local store LS of the SPE 206. In some embodiments, one SPE 206 may request the de-archiver to do decompression with another SPE. This may be implemented, e.g., using a remote procedure call (RPC) between processors. In this is example an SPE 206 asks the PPE 204 to do something for it. In a more conventional RPC it's the other way around.

Pre-Fetching

In some embodiments, the scheduler cache 305 (e.g., a HDD cache) may be used to pre-fetch a file from the media device into cache 117 on the storage device 115 so that the file can be read quickly later on. In such a case, a pre-fetch operation 413 may be inserted directly into the issue queue 402. The pre-fetch may be a standard manual pre-fetch which has been implemented by many types of caches, such as the "dcbt" instruction in the PowerPC CPU architecture. According to embodiments of the invention, the pre-fetches may be queued and executed as part of the scheduler loop described above. Pre-fetching may facilitate work with relatively slow source media (e.g. Blu-Ray and UMD) with relatively high latency and low throughput that must be accessed while other I/O requests are being fulfilled.

The scheduler 302 may be configured to implement such pre-fetching at a relatively low priority so that it will only run in the unused moments when the media device 118 would otherwise be idle, and won't interfere with other I/O requests. For example, the system 300 may have a slow media device 118 (e.g., an optical disc such as a Blu-Ray Disc (BD) drive) and a faster storage device 115, such as a hard disk drive. The scheduler cache layer 305 may be used to asynchronously copy a file from the optical disc drive to the hard disk. When the file is accessed later it will be read at the higher HDD speed (e.g., 20 MiB/s) instead of the slower optical disc speed (e.g., 8 MiB/s).

Figure 6:
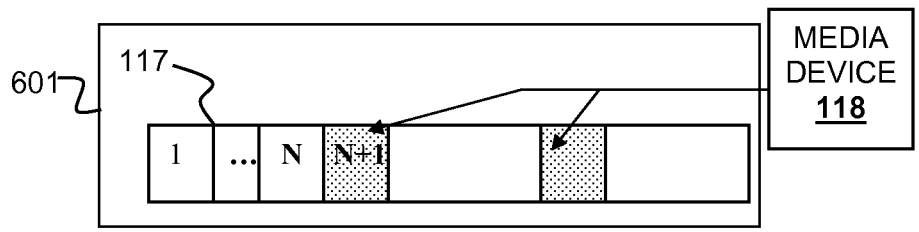
FIG. 6 is a schematic diagram illustrating an example of pre-fetching in a FIOS according to an embodiment of the present invention.

Although cache pre-fetching is generally done to a hard disk cache, pre-fetching may also be done to main memory 106, 206. Pre-fetch operations may be included at the end of the schedule queue 406 in the order in which they are received after scheduling is complete. In some embodiments, pre-fetch operations may be delayed if necessary. In some embodiments, the performance characteristic equation used by the scheduler 302 may include information about what is stored in the cache 118 as part of the state information. Pre-fetch operations are not scheduled in the same manner other I/O operations. Pre-fetch operations are held in a separate pre-fetch queue 413 which is only serviced when the schedule queue 406 is empty. A pre-fetch operation may be delayed, if necessary. Otherwise, pre-fetches may be executed in the order in which they are received. The scheduler 302 may keep the pre-fetch requests queued and only execute them when the I/O subsystem has been idle for a specified length of time. This prevents pre-fetches from interfering with normal I/O requests. In addition, pre-fetches are also not limited to a single cache block; they may be any size, or even pass a special "whole-file" value which tells the cache to load an entire file from beginning to end. Furthermore, though pre-fetches may be any size, pre-fetches may be implemented such that no more than one cache block is filled before returning to the scheduler 302 to check that the FIOS stack 302 continues to be idle. The FIOS stack 300 may be configured to implement pre-fetches in a way that avoids unnecessary pre-fetches. For example, as shown in FIG. 6, if no blocks are in a cache 601, the FIOS scheduler cache layer 305 may fill the first block and then return to check the idle state. If blocks 1 to N are in the cache 117 on the storage device 115, the (N+1)th block will be filled with data from the media device 118. The scheduler cache layer 305 may return to check the idle state. The process may be repeated until a new I/O arrives at the incoming queue. These features allow arbitrary numbers of pre-fetches to be queued so that it's quick and efficient for an application to pre-fetch large amounts of data from the media device 118 to the storage device 115 (or main memory 106) without interfering with normal scheduled I/O requests.

For example, in a game application, game data is often stored on medium such as a CD-ROM or HD-DVD disk that is read by the media device 118. The game may determine that a player is moving towards a particular destination and compute that the player should arrive there in 60 seconds. During that time, the FIOS stack 300 may pre-fetch files related to the destination from the media device. The application may cancel the pre-fetch if the player decides to turn around and head towards a different destination. In other embodiments, the application may use advance notification to prevent needed data in the cache 117 being overwritten.

Cache pre-fetching as described above may provide improved I/O performance in I/O driven applications, such as video games and on platforms with specific I/O needs, such as modern video game consoles. In particular, game data is often stored on a slow media such as optical media or network file server, but the game may have access to fast local storage like a HDD.

Data Transormation with Auxiliary Processor

According to another embodiment, a FIOS takes advantage of certain processor architectures that utilize a main processor and an auxiliary processor that has an associated local memory. Such embodiments may be used, e.g., for data transforms such as decompression or decryption. By way of comparison, certain previous de-archiving systems have used a simple decompression algorithm (such as zlib) running in a standard background thread. Embodiments of the present invention, by contrast, may include an abstract codec interface that allows both a standard decompressor implementation and a non-standard implementation configured to take advantage of processor architectures that include an auxiliary processor having an associated local memory such as the Cell processor architecture. Such embodiments allow a number of flags and constraints to be set by a de-compressor object, which the de-archiver 301 may then take advantage of to optimize memory use and speed. Many of these constraints and circumstances that lead to special handling may be unique to the circumstances of game programming, filesystem I/O decompression, or the architecture of the system 100.

Certain applications, such as video game applications, have a limited amount of memory available, which makes it desirable to use as little memory as possible. One common formulation is to only have three I/O buffers for I/O decompression: one buffer occupied by reading, and up to two temporary buffers (one for input and one for output) occupied by a data-transform operation (such as decompression or decryption). By way of example, and without limitation, certain embodiments may avoid using temporary buffers entirely by using an auxiliary processor with associated local memory (e.g., an SPE 206 in the cell processor 200) for data transforms.

For example, if decompression is handled by the main processor (e.g., the PPE 204), one buffer is typically required to temporarily store compressed data and another buffer is required to temporarily store decompressed data. If an auxiliary processor 105B with sufficient local memory 106B is available, the same decompression may be done using the local memory 106B instead of the temporary buffers. Both the compressed data and decompressed data may be stored in the local memory 106B. By way of example, in the certain cell processor architectures, the SPE 206 have a local store capacity of 256 Kbytes. This is often sufficient memory space for the compressed input, the decompressed output and the code for the decompression algorithm. By comparison, if the decompression is handled by the main processor 105A (e.g., the PPE 204) the compressed data is read to first buffer, decompressed, and the decompressed data is written to a second buffer. The decompressed data is then copied from the second buffer to its destination.

Figure 7A:
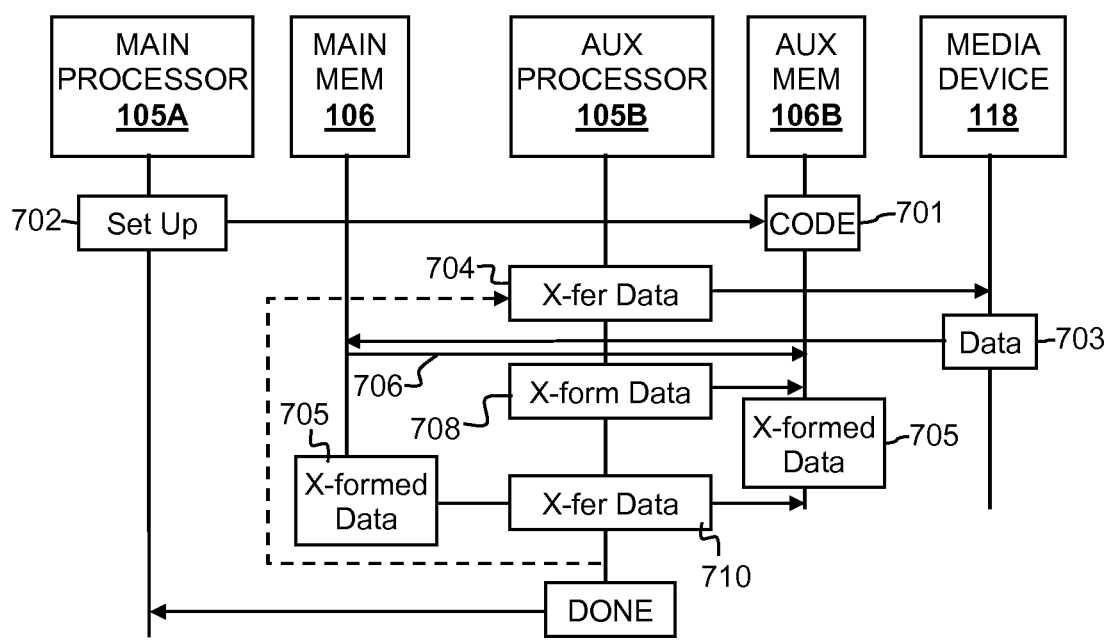
FIG. 7A is a flow diagram illustrating an example of I/O buffering using an auxiliary processor with associated local memory according to an embodiment of the present invention.
Figure 7B:
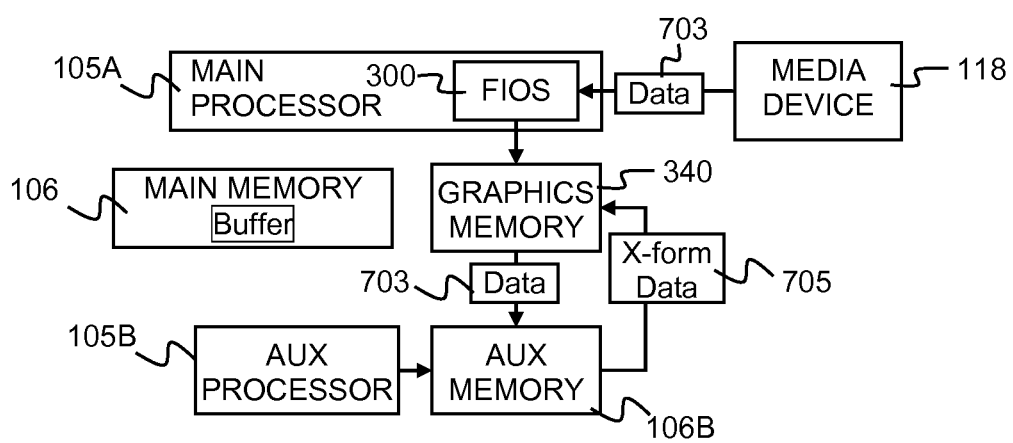
FIG. 7B is a flow diagram illustrating an example of I/O buffering and data transformation using an auxiliary processor with associated local memory according to an embodiment of the present invention.

FIG. 7A and FIG. 7B illustrate two examples among others, of implementing certain data transforms utilizing an auxiliary processor. Specifically, as illustrated in FIG. 7A, during the course of fulfilling an I/O request, the FIOS 300 running on the main processor 105A may invoke a data transform, e.g., via the data transform layer 311. The main processor 105A may set up the auxiliary processor 105B, as indicated at 702. Specifically, the main processor 105A may instruct the auxiliary processor 105B to load coded instructions 701 for implanting the data transform into the auxiliary processor's local memory 106B. The main processor or the auxiliary processor may then work through the FIOS stack 300 to transfer data 703 from the media device 118 to the main memory 106 as indicated at 704. The auxiliary processor 105B may then load the data 703 into the local memory 106B, as indicated at 706.

The auxiliary processor may then implement a transform on the data 703, as indicated at 708, to produce transformed data 705, which may be stored in the local memory 106B. By way of example, execution of the coded instructions 701 may decrypt or decompress the data 703. The transformed data 705 may be transferred to the main memory 106 as indicated at 710. Alternatively, the transformed data 705 may be delivered to some other destination, such as the storage device 115. The foregoing sequence of operations may be repeated for subsequent blocks of data until all data specified by the I/O request have been handled. Note that once the incoming data 703 has been transferred to the local memory 106B, it may be overwritten in the main memory by new incoming data or by transformed data 705.

By way of example, and not by way of limitation, a cell processor architecture, such as that depicted in FIG. 2 may be used to implement data decompression in accordance with FIG. 7A. The nature of SPU programming (where data is streamed into the local store LS of an SPE 206, and then streamed back out once processing is complete) combined with the demands of filesystem I/O decompression provide opportunities for improved I/O performance. For example, using an SPE 206 for decompression may provide a performance improvement from 37 Mbps to 42 Mbps as a result of freeing up an additional buffer. A similar de-compression may be implemented with the processor architecture used in the Sony Playstation 2. In such a case, the main processor is referred to as the emotion engine (EE) and one of the auxiliary processors, known as the I/O processor (IOP) has an associated local memory. In such a case, the de-archiver 301 may be running on the EE and de-compression may be implemented on the IOP along the lines illustrated in FIG. 7A. Alternatively, the technique depicted in FIG. 7A may be used for distributed computing architectures involving two processors with separately addressable memories.

It is noted that although the foregoing example deals with a data transform implemented by the transform layer, the method described with respect to FIG. 7A may be used in implementing any of the media filter layers 304. By contrast, prior art file I/O systems typically implement with a main processor (e.g., the PPU in cell processor examples).

In an alternative implementation, if the destination of data read from the media device 118 is a slow memory (e.g. a graphics memory 140, such as video random access memory (VRAM)) and the codec needs to perform random access to its output, the FIOS de-archiver may need to allocate a temporary output buffer. However, if the codec does not need random access (as is the case, e.g., with a SPU-implemented de-compressor) then the FIOS de-archiver 301 may avoid allocating a temporary output buffer and the data 703 may be decompressed directly to the destination. Furthermore, file system decompression may require "slop", or unused bytes; i.e. decompressing an entire 64 Kilobyte block when just a few bytes are needed. If the codec indicates that it can output just part of the compressed block (as is the case, e.g., with a SPU-implemented de-compressor) then the FIOS de-archiver may avoid allocating a temporary output buffer. In addition, an auxiliary processor 105B with associated local memory 106B may be used in any and all combinations of the above circumstances.

FIG. 7B illustrates an example of the use of the auxiliary processor 105B and local memory 106B in conjunction with a slow graphics memory 340. The FIOS 300 may read data from the media device 118 to the graphics memory 340 (e.g., VRAM). Data transfers to VRAM using buffers tend to be slow. However, reading VRAM data into certain types of auxiliary processor local memories (e.g., the local store LS of an SPE 206) is not a problem. In the example depicted in FIG. 7B, the FIOS 300 is implemented primarily on the main processor 105A. Un-transformed data 703 may be transferred from the graphics memory 340 to the local memory 106B associated with the auxiliary processor 105B. The FIOS 301 may load transformation instructions 701 into the local memory 106B to be executed by the auxiliary processor 105B. The auxiliary processor 105B may transform the data 703 into transformed data by executing the instructions 701 to generate transformed data 705. The transformed data may then be transferred to the graphics memory 340. In some variations on this embodiment, the un-transformed (e.g., encrypted or compressed) data 703 may be read from the media device 118 and stored in buffer in the main memory 106 before it is transferred to the local memory 106B.

Nested Archives

Previous FIOS implementations have included a random-access de-archiving system that allow the contents of a compressed archive to virtually appear in the filesystem hierarchy, and it retrieved data from those archives in an optimally efficient way by overlapping reading and decompression. Embodiments of the present invention refine this system by including an ability to handle nested archives with a single de-archiver layer 301 and no performance penalty. As used herein the term nested archives, refers to archives that are stored within other archives, which may themselves be stored in another archive to an arbitrarily deep level of nesting.

Nested archive support is particularly useful for satisfying the unique demands of game I/O and data layout. The use of nested archives can be synergistic with the drive model 302A used by the scheduler 302. Specifically, large files allow for a better of model drive head movement. Nested archive support may be greatly facilitated if the compressed archive format is random-access. By contrast, typically compressed archives are not random access. For example, zip, gzip, 7z, compression formats and the like typically require linear access from the start of the archive.

As used herein the term "archive" refers to a set of data files combined into a single, larger file. The source data may be stored unmodified, or one or more data transformations such as compression or encryption may be applied to any portion of the data. An index (sometimes referred to as a table of contents) may be kept with the archive which describes at least some aspect of the source files, such as a path and offset within the archive, so that they may be looked up and accessed individually. The term "nested archive" refers to an archive where one or more of the source data files is another archive (or nested archive). By virtue of this nesting any given block of source data may have zero or more data transforms applied to it. For example, a video game application having two levels (level 1 and level 2) may use a nested archive entitled "game-.psarc" which contains two archives entitled "level1.psarc" and "level2. psarc". This may facilitate development by allowing the game developers to use single archives ("level1.psarc", "level2. psarc", etc) for debug and testing purposes, rather than always spending the time to create the larger "game.psarc" archive every time.

Figure 8:
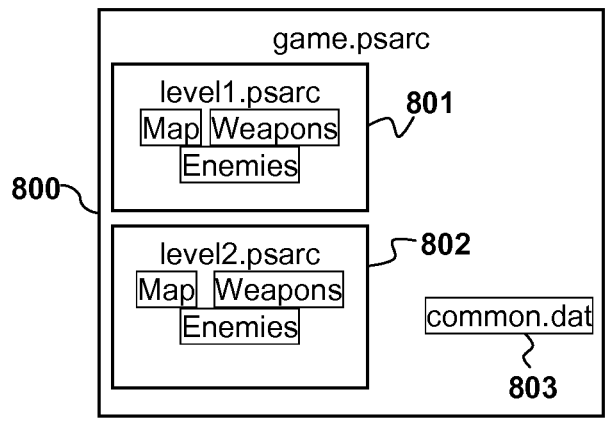
FIG. 8 is a block diagram illustrating a data structure for a nested archive that may be used in conjunction with embodiments of the invention.

Developers could generate nested archives but a conventional I/O reader can't read, or can't efficiently read, multiple level archives. To overcome this, the archive may be configured as shown in FIG. 8. In particular an outer archive 800 may include inner archives 801, 802 containing files with data for individual levels of a game. By way of example, and not by way of limitation, the inner archives 801, 802 may contain data relevant to a particular game level such as a map, weapons available at that level and enemies to be encountered at that level. The data for the inner archives 801, 802 may be compressed individually and bundled with common data 803. The files within the outer archive 800 may be compressed on a block by block basis. Each archive may include an index that allows a de-archiver to find any given block of data anywhere within the outer archive 800, including anywhere in the inner archives 801, 802. The index may be regarded as the equivalent of a table of contents for the archive.

When the FIOS 300 issues a request for a particular file from the archive, the request may look like this: Request: /game/level2/map(1000,10). The part "/game/level2/map" is referred to as a path, which is used to filed the particular file. The part "(1000,10)" identifies an offset and a length for the request. When the outer archive 800 or a portion thereof is to be read, the de-archiver 301 may consider a list of available files. The list may be different depending on which archives are open. For example, if neither the outer archive 800 nor the inner archives 801, 802 are open, the list may look like this:
/game.psarc
If the outer archive 800 is open, the list may look like this:
/game (folder)
/game/level1.psarc
/game/level2. psarc
/game/common.dat
If the inner archives are open the list may look like this:
/game/level1/map
/game/level1/weapons
/game/level1/enemies
/game/level2/map
/game/level2/weapons
/game/level2/enemies
/game/common.dat Each archive 800, 801, 802 may have a list of hashes of paths (or partial paths) of the contents. The hash lists may be used to generate the table of contents (TOC) for the archive. For example, the table of contents for the outer archive 800 may be configured as follows:

| TOC: | hash (/level1.psarc) |
| --- | --- |
|  | hash (/level2.psarc) |
|  | hash (/common.dat) |

Where hash( ) refers to the hash of the quantity in parentheses. Any suitable hash may be used, e.g., an MD5 hash.

Similarly, the table of contents for the level 1 inner archive 801 may be configured as follows:

| TOC: | hash(/map) |
| --- | --- |
|  | hash(/weapons) |
|  | hash(/enemies) |

Figure 9:
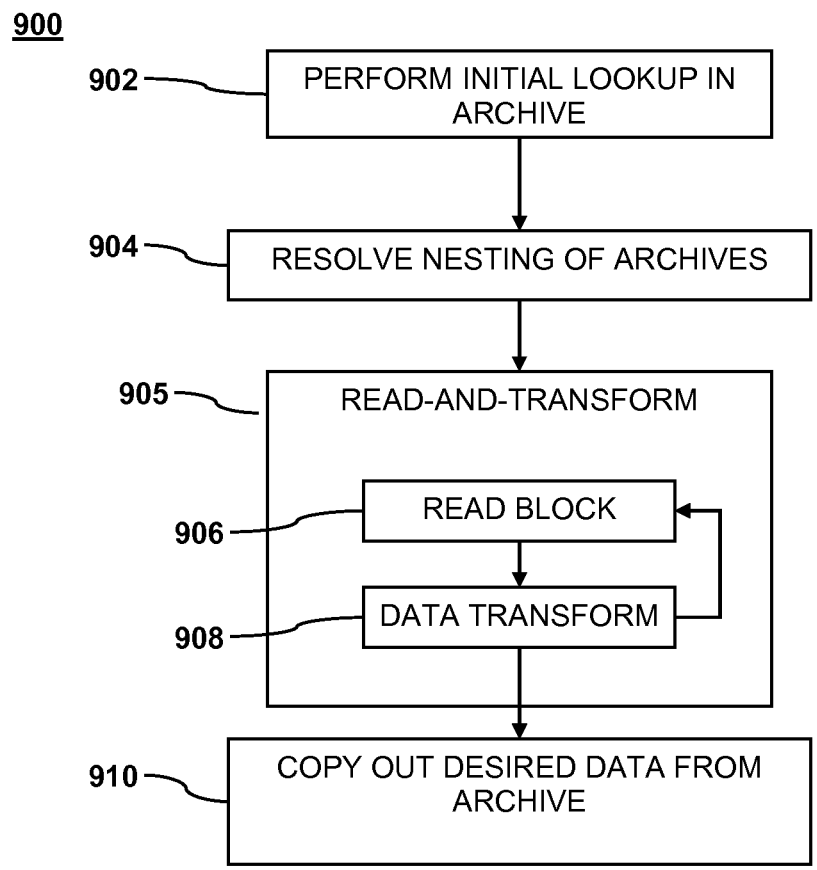
FIG. 9 is a flow diagram illustrating a de-archiver in accordance with an embodiment of the present invention.

If nested archives of the type shown in FIG. 8 are used, the de-archiver 311 may be configured to deal with them. By way of example, the de-archiver 311 may implement a de-archiving method 900 as shown in FIG. 9. The method 900 may be being with an initial lookup in the archive, as indicated at 902. By way of example, and not by way of limitation, the initial lookup may return an initial path for the data that is sought, an offset, a length, and an ordered list of required data transforms. Specifically, an I/O request might be as follows:

(/game/level2/weapons, offset 0, length 50000, none)

The initial lookup of this file in the inner archive may return this:

(/game/level2. psarc, offset 20000, length 30000, zlib decompress)

After the initial look-up, the de-archiver 311 may resolve nesting, as indicated at 904. In resolving the nesting, the de-archiver 311 may attempt to determine whether the archive 802 is stored within another archive and whether it stored compressed or uncompressed.

In resolving the nesting, the de-archiver 311 may return a path for the data that is sought, an offset, a length, and an ordered list of required data transforms. By way of example, the path may have the form: /game.psarc, offset 120000, length 30016, decrypt+zlib decompress. The nesting may be resolved with a loop rather than recursion to avoid a stack limit. Once nesting has been resolved, the data may be transferred from the media device 118. By way of example, and not by way of limitation, the de-archiver 311 may iteratively read and transform the data block-by-block as indicated at 905. Specifically the de-archiver may read a block of data, as indicated at 906, then apply the data transforms to the block that was read as indicated at 908. Multiple levels of nested archives may be resolved down to a single interleaved read-and-transform loop reading blocks from the outermost archive, to make maximally efficient use of the source media. After each block has been read and transformed, the desired portion may be copied out to a suitable destination, e.g., in the main memory 106, storage device 115 or elsewhere as indicated at 910. The desired portion of the block may be of any size, e.g. as small as a single byte or as large as the entire block.

Overlay Layer

As discussed above, the media filter layers 304 in the FIOS stack 300 may include an overlay layer 307. According to an embodiment of the invention, the overlay layer 307 may be configured to allow arbitrary overlaying of files and directories at the filesystem level. The general concept may be compared to a union mount in Unix except that it's far more flexible. A typical union mount works by merging a directory in one filesystem with the entire contents of another filesystem. The overlay layer 307 does something similar, but is much more flexible and full-featured. For example, the overlay layer 307 may operate at the granularity of directories, files, or even byte ranges within files. Directories may be hidden, or their contents replaced using the overlay layer 307. In addition, the overlay layer 307 may be used to replace files requested from a primary data source with other files from a secondary data source. The secondary data source may be a file or a directory, which may be on the same medium as the primary data source or another medium. In addition, the second data source may even be a virtual data source so that the data may be specified by a callback. Within this particular context, the term "callback" refers executable code that is passed as an argument to other code.

Furthermore, the application creating an overlay may specify criteria for how and when the overlay should be applied by the overlay layer 307. For example, if the application 103 is overlaying directory B onto directory A, the criteria may be "overlay"=look for files in B first, then in A; "underlay"=look for files in A first, then in B; "newer"=if the file exists in both places, use the one with the more recent modification date; "older"=if the file exists in both places, use the one with the earlier modification date; and so on.

The overlay layer 307 may be configured to allow for arbitrary mapping of requests for an I/O read from a particular source to a read from another source. For example, a request to read a particular file from the media device 118 may be mapped to a corresponding file located, e.g., on the storage device 115. Using such a feature data ranging from specific bytes within a file to whole directories may be hidden and swapped around. By specifying which directories, files or bytes need to be replaced, the overlay layer 307 can minimize the amount of work that has to be done by FIOS stack 300 in order to handle a particular I/O request.

The overlay layer 307 may be used, e.g., to implement updates to software and/or data. In many prior art update systems, an executable linkable file (ELF) is copied from the media device 118 to the storage device 115 and then patched with updated code or data. With embodiments of the present invention, by contrast, the application 103 may instruct the FIOS 101 to fill in certain byte ranges with data from the media device 118 and other byte ranges from some other location, such as the storage device 115. Therefore, it is not necessary to copy an entire file to patch it. Instead, the patching may be implemented at the I/O system level.

Most prior patching implementations are based on replacing entire files. This is the simplest to implement and therefore by far the most common method. The enhanced patching that may be implemented by the overlay layer 307, by contrast allows much more complicated and useful patterns, such as patching within a compressed and encrypted archive.

Speed Emulation Layer

In certain embodiments of the present invention, the speed emulation layer 315 may be used to slow down a faster storage device during development in order to emulate the performance of a slower I/O device. The speed emulation layer 315 may utilize a model of the seek time, throughput, and other performance characteristics of the slower I/O device. For example, the speed emulation layer 315 may slow down the storage device 115 (e.g., a hard disk drive) to emulate a slower seek time and/or throughput of the media device 118, e.g., a HD-DVD, such as a Blu-Ray drive.

According to an embodiment of the present invention, the speed emulation layer 315 may be implemented by feeding the drive performance data gathered during a previous session into future sessions. As discussed above, the performance model used by the scheduler 302 may be configured to model arbitrarily complex drive characteristics like throughput, laser wiggles, read head movements, layer changes, and even request overhead. The speed emulation layer 315 may use this information provide highly accurate emulation of a particular media device. This emulation, since it is based on runtime performance, will be much more accurate than simple naive emulation layers which try to simply match the throughput while ignoring the more complex details like seek times.

Embodiments of the present invention provide for improved I/O performance in applications and systems that utilize a significant amount of I/O. As discussed above, embodiments of the present invention are particularly useful in video game applications and video game systems. However, the embodiments of the invention or not limited to such applications and systems.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. In a system having a processor unit, a memory, and a media device, wherein the processor unit includes a main processor and an auxiliary processor having an associated local memory, a method for handling input or output (I/O) to or from the media device, the method comprising:
   a) receiving an incoming I/O request from an application running on the processor to transfer data to or from the media device;
   b) computing a predicted time $T_p$ to complete the incoming I/O request;
   c) inserting the incoming I/O request into a schedule embodied in the memory, wherein a position of the incoming I/O request within the schedule depends at least partly on the predicted time $T_p$;
   d) servicing the incoming I/O request according to the schedule, wherein a subsequent I/O request in the schedule that is received before the incoming I/O request is serviced is not serviced until after the incoming I/O request is serviced completely, wherein the incoming I/O request is serviced by transferring data from the media device to the local memory, and transforming the data in the local memory using the auxiliary processor.

2. The method of claim 1 wherein b) includes calculating $T_p$ according to a performance characteristic equation (PCE) involving one or more parameters of the media device and one or more coefficients determined from the incoming I/O request.

3. The method of claim 2 wherein the one or more parameters include a request overhead x, a head movement rate y and a throughput z.

4. The method of claim 3 wherein the one or more coefficients include an overhead coefficient A, a head travel distance B and an amount of data to transfer C.

5. The method of claim 4 wherein the characteristic equation is of the for $T_p = Ax + By + Cz$.

6. The method of claim 2 wherein c) includes iterating the PCE with different coefficients for a plurality of different I/O requests in the schedule to determine a total time T for servicing the I/O requests.

7. The method of claim 6, wherein c) further comprises computing two or more different values of the total time T for two or more different orders of the plurality of I/O requests, and inserting the incoming I/O request into the schedule based on an optimum value of the total time T.

8. The method of claim 7 wherein the value of the optimum value of the total time T is a minimum value of the total time T for the two or more different orders of the plurality of I/O requests.

9. The method of claim 2, wherein b) includes measuring an actual time taken $T_a$ in conjunction with the one or more coefficients to iteratively solve the PCE for values of one or more unknown parameters.

10. The method of claim 1, wherein d) further comprises extracting specific data from a compressed nested archive.

11. The method of claim 1 wherein the system further comprises a graphics processor and an associated graphics memory, wherein d) includes reading data from the media device into the graphics memory, transferring the data from the graphics memory to the local memory, performing a data transform on the data using the auxiliary processor to produce transformed data and transferring the transformed data back to the graphics memory.

12. The method of claim 1 wherein d) includes implementing a data overlay, wherein one or more primary data units transferred between the media device and the memory are replaced with one or more secondary data units from a secondary data source.

13. The method of claim 12 wherein a source of the primary data units and the secondary data source are located on the same media.

14. The method of claim 12 wherein a source of the primary data units and the secondary data source are located on different media.

15. The method of claim 12 wherein the secondary data source is a virtual data source.

16. The method of claim 15 wherein the one or more secondary data units are specified by a callback.

17. The method of claim 1, wherein the system further includes a fast storage device, wherein d) includes pre-fetching one or more data units from the media device to the fast storage device and, subsequently transferring the data units from the fast storage device.

18. The method of claim 17 wherein the fast storage device is a hard disk drive.

19. The method of claim 18 wherein the media device is a high-capacity optical disc drive.

20. The method of claim 17 wherein pre-fetching one or more data units includes pre-fetching the one or more data units during a period of time when I/O is otherwise idle.

21. The method of claim 20 wherein pre-fetching one or more data units includes pre-fetching a first group of one or more data units from the media device, checking for idleness of the media device, and pre-fetching a second group of one or more data units from the media device if I/O is idle, or delaying a pre-fetch of the second group if I/O is not idle.

22. The method of claim 1 wherein b) includes adjusting one or more parameters used to determine $T_p$ to emulate operation of a different and slower media device than the media device associated with the system.

23. A system, comprising:
   a processor unit;
   a memory coupled to the processor unit;
   a media device coupled to the processor unit; and
   a set of processor executable instructions embodied in the memory, the instructions being configured, when executed, to implement a method for handling input or output (I/O) to or from the media device, the method comprising:
   a) receiving an incoming I/O request from an application running on the processor to transfer data to or from the media device;
   b) computing a predicted time $T_p$ to complete the incoming I/O request;
   c) inserting the incoming I/O request into a schedule embodied in the memory, wherein a position of the incoming I/O request within the schedule depends at least partly on the predicted time $T_p$; and
   d) servicing the incoming I/O request and a subsequent I/O request according to the schedule, wherein a subsequent I/O request in the schedule that is received before the incoming I/O request is serviced not serviced until after the incoming I/O request is serviced completely, wherein the set of processor executable instructions further include one or more media filter layers including a de-archiver layer, an overlay layer, a data transform layer, or a simulated layer.

24. In a system having a main processor, an auxiliary processor having an associated local memory, a main memory, and a media device, a method for handling input or output (I/O) to or from the media device, the method comprising:
 a) receiving an incoming I/O request from an application running on the main processor to transfer data to or from the media device;
 b) inserting the incoming I/O request into a schedule embodied in the main memory; and
 c) servicing the incoming I/O request according to the schedule and one or more filters, wherein a subsequent I/O request in the schedule that is received before the incoming I/O request is serviced is not serviced until after the incoming I/O request is serviced completely, wherein at least one of the one or more filters is implemented by the auxiliary processor.

25. In a system having a processor unit, a memory, and a media device, a method for handling input or output (I/O) to or from the media device, the method comprising:
 a) receiving an incoming I/O request from an application running on the processor to transfer data to or from the media device;
 b) computing a predicted time $T_p$ to complete the incoming I/O request;
 c) inserting the incoming I/O request into a schedule embodied in the memory, wherein a position of the incoming I/O request within the schedule depends at least partly on the predicted time $T_p$; and
 d) implementing the incoming I/O request according to the schedule, wherein a subsequent I/O request that is received before the incoming I/O request is implemented is not implemented until after the incoming I/O request is implemented completely, wherein implementing the incoming I/O request or the subsequent I/O request includes extracting specific data from a compressed nested archive.

26. In a system having a processor unit, a memory, and a media device, a method for handling input or output (I/O) to or from the media device, the method comprising:
 a) receiving an incoming I/O request from an application running on the processor to transfer data to or from the media device;
 b) computing a predicted time $T_p$ to complete the incoming I/O request;
 c) inserting the incoming I/O request into a schedule embodied in the memory, wherein a position of the incoming I/O request within the schedule depends at least partly on the predicted time $T_p$; and
 d) implementing the incoming I/O request according to the schedule, wherein a subsequent I/O request in the schedule that is received before the incoming request is implemented is implemented after the incoming I/O request is implemented completely, wherein implementing the incoming I/O request or the subsequent I/O request includes implementing a data overlay, wherein one or more primary data units transferred between the media device and the memory are replaced with one or more secondary units from a secondary data source.

27. The method of claim 26 wherein a source of the primary data units and the secondary data source are located on the same media.

28. The method of claim 26 wherein a source of the primary data units and the secondary data source are located on different media.

29. The method of claim 26 wherein the secondary data source is a virtual data source.

30. The method of claim 29 wherein the one or more secondary data units are specified by a callback.

31. In a system having a processor unit, a memory, a fast storage device and a media device, a method for handling input or output (I/O) to or from the media device, the method comprising:
 a) receiving an incoming I/O request from an application running on the processor to transfer data to or from the media device;
 b) computing a predicted time $T_p$ to complete the incoming I/O request;
 c) inserting the incoming I/O request into a schedule embodied in the memory, wherein a position of the incoming I/O request within the schedule depends at least partly on the predicted time $T_p$, wherein the I/O request includes a request to pre-fetch one or more data units from the media device in anticipation of a future need for the files; and
 d) implementing the incoming I/O request according to the schedule, wherein a subsequent I/O request in the schedule that is received before the incoming I/O request is implemented is implemented after the incoming I/O request is implemented completely, wherein implementing the incoming I/O request or the subsequent I/O request includes pre-fetching the one or more data units from the media device to the fast storage device and, subsequently transferring the data units from the fast storage device, if the one or more data units are needed by the system, or cancelling the request to pre-fetch the one or more data units if the one or more data units are not needed by the system.

32. The method of claim 31 wherein the fast storage device is a hard disk drive.

33. The method of claim 32 wherein the media device is a high-capacity optical disc drive.

34. The method of claim 33 wherein pre-fetching one or more data units includes pre-fetching the one or more data units during a period of time when I/O is otherwise idle.

35. The method of claim 33 wherein pre-fetching one or more data units includes pre-fetching a first group of one or more data units from the media device, checking for idleness of the media device, and pre-fetching a second group of one or more data units from the media device if I/O is idle, or delaying a pre-fetch of the second group if I/O is not idle.

36. In a system having a processor unit, a memory, a fast storage device and a media device, a method for handling input or output (I/O) to or from the media device, the method comprising:
 a) receiving an incoming I/O request from an application running on the processor to transfer data to or from the media device;
 b) computing a predicted time $T_p$ to complete the incoming I/O request, wherein computing the predicted time $T_p$ includes adjusting one or more parameters used to determine $T_p$ to emulate operation of a different and slower media device than the media device associated with the system;
 c) inserting the incoming I/O request into a schedule embodied in the memory, wherein a position of the incoming I/O request within the schedule depends at least partly on the predicted time $T_p$; and d) implementing the incoming I/O request according to the schedule, wherein a subsequent I/O request that is received before the incoming I/O request is implemented is implemented after the incoming I/O request is implemented completely.

\* \* \* \* \*